UNITED STATES PATENT OFFICE.

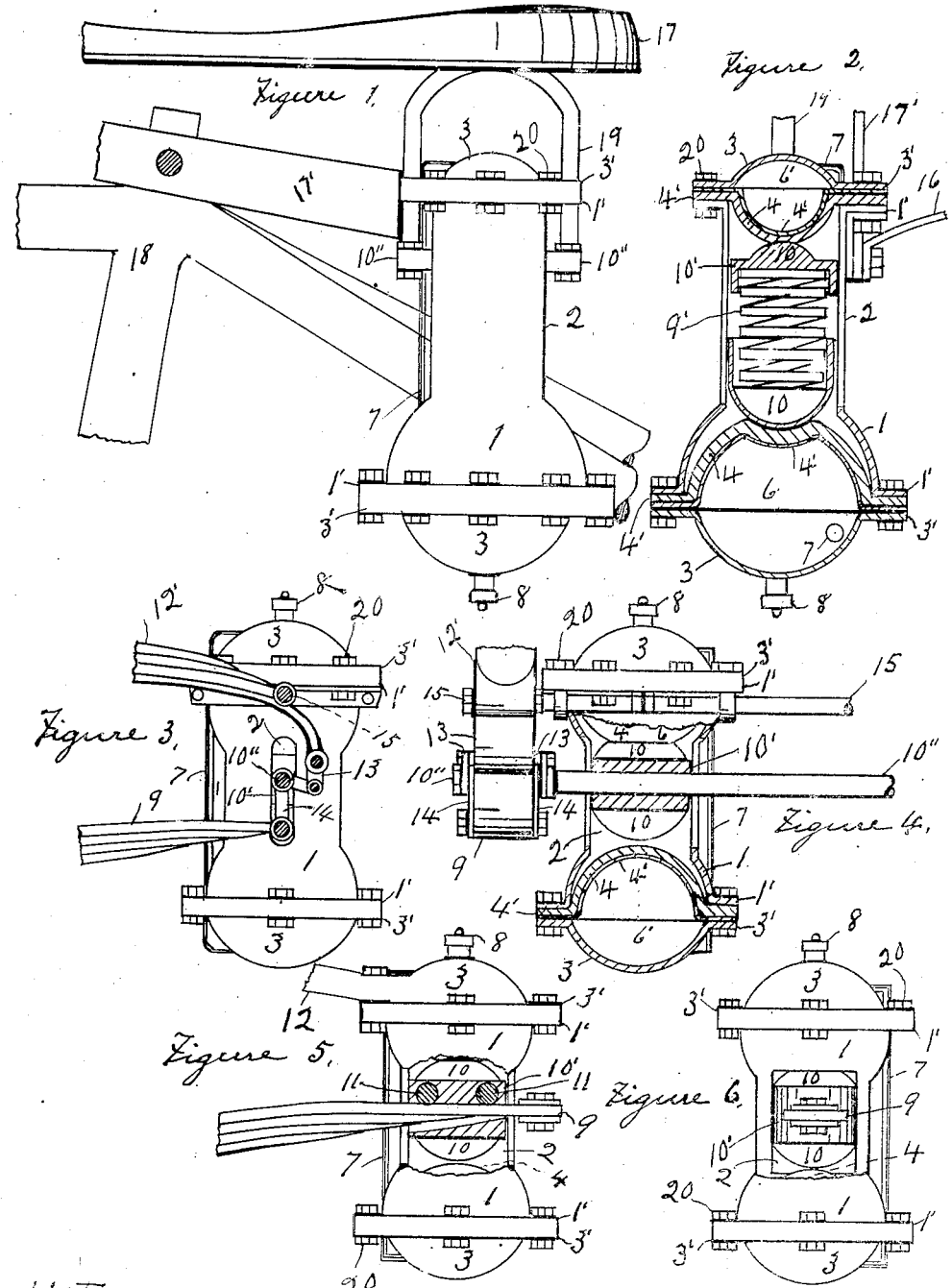

CHARLES H. COX, OF LOS ANGELES, CALIFORNIA.

PNEUMATIC SHOCK-ABSORBER.

1,328,496.  Specification of Letters Patent.  Patented Jan. 20, 1920.

Application filed August 22, 1918. Serial No. 251,027.

*To all whom it may concern:*

Be it known that I, CHARLES H. COX, a citizen of the United States, residing at Los Angeles, in the county of Los Angeles and State of California, have invented certain new and useful Improvements in Pneumatic Shock-Absorbers, of which the following is a specification.

This invention is intended primarily for use in connection with motor driven vehicles, seats and the like, and may be attached to the body portion of an automobile via the horn extension, and to the running gear or axle portion via the end of the spring, or in such other place, places or manner as may be preferred, for the purpose of minimizing the effects of jolts or jars caused by road inequalities or otherwise.

The object of the invention is to construct an absorber so that it may be regulated to exert a greater or less carrying capacity, by inflating the inner pneumatic receptacles to a greater or less extent, and to provide simple means of attaching the device, either to a vehicle or a seat, in such a manner as to cause the metal spring (where it is used) to work in conjunction with the absorber.

Another object, which more especially forms the subject matter of the present invention, is to provide pneumatic means to retard the rebound after the absorber and spring have been depressed by a jolt or jar, thereby greatly increasing the comfort of the occupants, and the welfare of the vehicle.

A further object of the invention is to utilize by means of conduit 7 the respective air chambers during their neutral periods as compensating or relief chambers, thus minimizing an increase of the air pressure during the action of the respective chambers; resulting in not only softening the action, but also in reducing the strain on the walls of the chambers.

Other objects may hereinafter appear.

I attain these objects by the mechanism illustrated in the accompanying drawings, in which Figure 1 is a fragmentary side view of a motorcycle frame and seat thereof, showing one form and arrangement of the shock-absorbing means embodying the invention.

Fig. 2 is a rear view in cross-section of the absorber, showing the relative positions of the movable parts in connection with the air chambers, the unity of said chambers via conduit 7 and means for their inflation; also means and methods of connecting the device to a motorcycle frame and seat thereof.

Fig. 3 is a side view illustrating a modified form of the invention and in connection with an automobile spring and shackle. A yoke 13 as shown herein, or any other suitable device, may be employed for additional lateral stability.

Fig. 4 is an end view of the absorber partly in cross section, in order to show more particularly the means and methods which may be employed to connect the casing and working parts to a vehicle via the spring.

Fig. 5 is a side view of the absorber attached to a vehicle via the horn extension; the casing of said absorber being broken away in order to show a roller bearing slide arrangement for the spring, thus obviating the necessity for a shackle.

Fig. 6 is an end view thereof.

Similar figures refer to similar parts throughout the several views.

Referring to Figs. 1 to 6 inclusive: The shock-absorber consists of a metallic casing 1, which may be partly cylindrical and partly hemispherical in form, having flanges 1' and slots 2; 3 are convex ends with flanges 3' designed to connect with flanges 1' of casing 1; 4 are hemispherically formed, flexible, non-stretchable air casings, preferably of a fabricated construction, with an inner lining of rubber 4' to securely retain air, which with the convex ends 3, form the twin chambers 6 and 6'; 7 is a conduit connecting air chambers 6 and 6', thus unionizing said air chambers; 8 is a check valve to admit air to chambers 6 and 6'; 9 and 9' are metallic springs, 9 being of the leaf type and 9' being of the spiral type, said springs may be interposed between convex deforming means 10, said means 10 being integral with or attached to plunger slide 10', said slide in Figs. 1, 2, 3 and 4 is provided with extensions 10'' which may be integral or otherwise.

In Figs. 1 and 2, 10'' also provides means of connecting the seat with the absorber, and in Figs. 3 and 4 10'' provides means of connecting the device with the spring and also provides means of lateral stability.

In Fig. 5 11 are roller bearings to facilitate the elongation of spring 9; 12 is a segment illustrating means to connect the device to the body portion of a vehicle; 12' in Figs. 3 and 4 shows the upper portion of a ¾ elliptical spring, part of which is connected via yoke 13 to extension 10″ for the purpose of lateral support; 14 is a shackle connection between spring 9 and extension 10″; 15 is a cross-rod anchorage and 16 in Fig. 2 is a lateral support; 17 in Fig. 1 is a seat; 17′ is a seat bracket; 18 is a segment of a motorcycle frame; 19 is a plunger rod in connection with seat 17 and extension 10″; 20 are bolts to securely fasten the different parts together.

Referring to the action of the absorber, after due inflation thereof, when the vehicle is in motion and jolts are encountered, the slidable cylindrically-formed plunger slide 10′ will respond to the influence of springs 9 or 9′, and, in action, will cause convex means 10 to deform the hemispherically formed flexible part 4, by folding the walls thereof inwardly, thereby increasing its supporting area in accordance with the jolt rendered (similar to the flattening out process of the pneumatic tire under a jolt or added load), and at the same time increasing the air pressure in accordance with the air displaced, relative to the dimensions of the air chambers.

The recoil action immediately follows the jolt, whereupon a folding process and a displacement of air occurs in air chamber 6′, the velocity of said recoil being thereby retarded and its violence checked, the principle of absorbing the recoil action being almost identical with the absorption of the direct action; the operations causing a merging of the air displaced throughout air chambers 6 and 6′ via the conduit 7.

The mechanism prevents any severe jolts, jars or violent rebounds, since the several elements or devices composing the complete structure adjust themselves automatically and without jar or undue friction to the changed conditions incident to the use of the device in connection with vehicles and seats.

Such modifications in the structure and application of the device as come within the scope of the appended claims are considered a part of this invention.

What I consider is new and desire to secure by Letters Patent is—

1. A pneumatic shock absorber comprising a rigid casing adaptable to anchorage; a pair of globular formed inflated and deformable, semi-flexible, unionized air cushions attached to said casing, one at each end thereof; and a yieldingly supported duplex plunger having convex ends slidably mounted within said casing and in engagement with said cushions.

2. A pneumatic shock absorber comprising a base adaptable to anchorage; semi-flexible inflatable and deformable unionized air cushions; a duplex plunger having convex ends slidably mounted within said base and opposing said cushions.

3. A pneumatic shock-absorber comprising a guide; a semi-flexible air cushion adaptable to inflation attached to each end of said guide; a conduit connecting said cushions for the free passage of air from cushion to cushion; and a slidably mounted duplex-plunger having a slot therein, roller bearings in connection therewith, and convex ends opposing said air cushions, said plunger being positioned within said guide and arranged for connection with a spring.

4. A pneumatic shock absorber for vehicles; comprising a hemispherical and cylindrically formed base; a pair of inflatable and deformable unionized air cushions attached thereto, one at each end of said base; and convex plungers suitably positioned within said base to deform said cushions separately.

5. A pneumatic shock absorber consisting of a base; a pair of semi-flexible inflated and deformable unionized air cushions attached to said base, one at each end thereof; and a duplex plunger having convex ends slidably mounted within said base and opposing said cushions.

6. A pneumatic shock absorber for vehicles; consisting of a guide; unionized globular formed air chambers adaptable to inflation and deformation in connection with said guide; and convex plungers suitably positioned to deform each of said chambers separately.

7. A pneumatic shock absorber for vehicles; comprising a casing; semi-flexible unionized air chambers adaptable to inflation and depression attached thereto; and a spiral spring having convex plungers mounted at each end thereof, slidably positioned within said casing.

8. A pneumatic shock absorber consisting of a rigid casing, a pair of semi-flexible air cushions within said casing, a conduit connecting said cushions for the free passage of air from one of said cushions to the other, and a duplex plunger slidably positioned between said cushions and comprising a yielding base having convex ends in engagement with said cushions.

CHARLES H. COX.

Witnesses:
A. W. HAEKMAN,
H. D. CLARK.